United States Patent Office 3,347,926
Patented Oct. 17, 1967

3,347,926
AMMONOLYSIS PROCESS FOR PRODUCING ALIPHATIC AMINES
John D. Zech, Wilmington, Del., assignor to Atlas Chemical Industries, Inc., Wilmington, Del., a corporation of Delaware
No Drawing. Filed Apr. 15, 1964, Ser. No. 360,130
5 Claims. (Cl. 260—585)

ABSTRACT OF THE DISCLOSURE

An improved ammonolysis process for preparing aliphatic amines which comprises reacting a hydroxy-containing compound with an aminating agent in the presence of a Raney nickel catalyst containing a minor amount of chromium and at a temperature from about 150° C. to about 275° C.

---

The present invention relates to the preparation of aliphatic amines and more particularly, to the preparation of aliphatic amines by reacting an hydroxy-containing material such as a primary or secondary alcohol or mixtures thereof and an aminating agent.

It is well-known that amines may be prepared by eliminating water from a primary or secondary alcohol in the presence of ammonia, a primary, or a secondary amine and a dehydration catalyst, such as, alumina or thorium oxide, at temperatures generally in the order of from about 300° to about 500° C. in the vapor phase. In reactions which utilize alcohol starting materials which are high boiling and thermally unstable a liquid phase conversion process is employed wherein an active metal hydrogenation catalyst is used. Raney nickel has proven to be a widely used active metal hydrogenation catalyst of this type. At a reaction temperature of 250° C., Raney nickel has good activity. However, as the temperature is lowered the activity drops off rather rapidly and at 200° C. the rate of ammonolysis of an alcohol promoted by the catalyst is quite low.

The present invention relates to an improved ammonolysis process wherein a catalyst containing nickel and chromium is utilized. The present catalyst allows an ammonolysis process to be carried out at a practical rate at lower temperatures and lower pressures than those used in the prior art ammonolysis processes. The present catalyst may be prepared from a nickel-aluminum-chromium alloy, as for example, No. 2428, a product of The Raney Catalyst Co. of Chattanooga, Tenn., by following the procedure given in Organic Syntheses, vol. 21, pages 15 to 17, for the preparation of Raney-type catalysts. Suitably, alloys from which the present catalysts are made contain, in percent by weight, from about 45 to about 65% aluminum, from about 34 to about 50% of nickel, and from about 1% to about 5% of chromium.

The process of the present invention is particularly adaptable to a liquid phase ammonolysis reaction.

The alcohol starting materials suitable for use in the present invention are generally primary and secondary alcohols. Tertiary alcohols are non-reactive; however, they may be utilized as inert diluents in the ammonolysis process. Suitable alcohols include ethanol, n-propanol, isopropanol, n-butanol, sec. butanol, isobutanol, n-amyl alcohol, 1-octanol, 2-octanol, cyclohexanol, tridecyl alcohol, oleyl alcohol, stearyl alcohol, benzyl alcohol, and 2-phenyl ethanol. Polyhydric alcohols having primary and secondary hydroxyl groups which are not attached to adjacent carbon atoms are also suitable, for example, 1,3-propanediol, 1,3-butane diol, 1,4-butane diol, 1,5-pentane diol, hexamethylene glycol, decamethylene glycol, 1,12-dihydroxy octadecane, diethylene glycol, triethylene glycol, tetraethylene glycol, higher polyethylene glycols, dipropylene glycol, and tripropylene glycol. In addition, oxyalkylene derivatives of alcohols, phenols and amines are also suitable with the exception that in the case of oxyalkylene phenols, more than one oxyalkylene group must be attached to the oxyphenyl radical. Thus phenoxyethanol (phenyl Cellosolve) is not suitable since it is cleaved to produce phenol. On the other hand, phenoxyethoxyethanol (phenyl carbitol) is suitable for ammonolysis, no cleavage to phenol being encountered. Other suitable oxyalkylene compounds include polyoxyethylene, polyoxypropylene and polyoxybutylene derivatives of (1) mono and polyhydric alcohols such as ethanol, butanol, octanol, dodecanol, tridecyl alcohol, stearyl alcohol, oleyl alcohol, glycerol, sorbitol, isosorbide, of (2) phenols such as phenol, cresol, p. tert. butyl phenol, p-octyl phenol, nonyl phenol, dodecyl phenol, dinonyl phenol, xylenols, etc. and of (3) amines such as butyl amine, dibutyl amine, dodecyl amine, hexadecyl amine, octadecyl amine, ethylene diamine, diethylene triamine, etc.

Suitable aminating agents for use in the present invention are ammonia or primary or secondary amines, for example, methyl amine, dimethyl amine, ethyl amine, diethyl amine, n-butyl amine, sec. butyl amine, isobutyl amine, 1-octyl amine, n-dodecyl amine, octadecyl amine, morpholine, pyrollidine, piperidine, piperazine, ethylene diamine, diethylene triamine, and benzyl amine.

The reaction is generally carried out in the absence of solvents or inert diluents but if desired may be carried out in the presence of inert solvents and diluents, for example, tertiary alcohols such as tertiary butanol, and tertiary amyl alcohol; ethers, such as, diethyl ether, ethylene glycol dimethyl ether, and dioxane; aliphatic and aromatic hydrocarbons, such as, hexane, heptane, cyclohexane, benzene, toluene, and xylene, and; non-reactive tertiary amines, such as, pyridine, picoline, and lutidine. While a non-aqueous medium is preferable, water, in minor amounts, is usually not detrimental.

Generally ammonolysis processes are carried out under pressure, the amount of pressure being dependent upon temperature, the relative proportions of the reactants, the mutual solubility of the reactants and diluents (if any) and the boiling points of the reactants and products. Generally it is desirable to operate the reaction at the lowest possible pressures and therefore, a low temperature of reaction is a major consideration. The present catalyst retains an activity at lower temperatures levels than normally can be economically utilized in ammonolysis processes permitting: (1) the use of lower temperatures which results in less pressure and consequently requires less costly equipment; (2) the use of shorter reaction times giving greater throughput, and; (3) the use of less catalyst. In general, sufficient catalyst is used to catalyze the process at a reasonable rate. Generally upwards from about 1.0% by weight of the starting material is sufficient to fulfill this requirement at a reaction temperature of about 200° C. Usually amounts of catalyst over about 5.0% by weight of the starting material yield no obvious improvement.

The present ammonolysis reaction may be carried out at temperatures ranging from about 150° C. to about 275° C. A temperature range of between 175° and 225° C. has been found to be eminently suited for carrying out the ammonolysis process of the present invention. Temperatures of 175° C. and higher generally cause the reaction to proceed at a practical rate. Temperatures of 225° C. and higher generally cause the reaction to proceed at a quite rapid rate but, of course, accompanied by undesired high pressures.

The reaction lends itself readily to batch or continuous operation. In a continuous process, the catalyst can be charged continuously as a slurry along with the other reactants or can be in a fixed bed in granular form.

Alcohols may be converted with the catalysts of the present invention into primary, secondary and tertiary amines depending upon the specific reaction conditions used, for example, the ratio of ammonia to alcohol, the reaction time and temperature, and the catlayst concentration. In general, high temperatures and longer reaction times favor secondary and tertiary amine formation as do low ammonia to alcohol ratios while high ammonia to alcohol ratios favor primary amine formation as do shorter reaction periods and lower temperatures. By proper selection of time, temperature, and ammonia to alcohol ratio it is possible to obtain essentially complete ammonoolysis to produce almost entirely primary amine. When secondary and tertiary amine are desired it is possible to select conditions which favor their formation but not to the exclusion of the others. Generally a molar excess of ammonia yields a product high in primary amine content. An ammonia to alcohol ratio of 1 or slightly lower than 1 may be used to produce a product having a high content of secondary and tertiary amines. In such cases, the undesired amines would be recycled after separation from the desired amine by known processes such as fractional distillation, etc. Where primary amine is desired as the sole product from the ammonolysis of an alcohol with ammonia, it is preferred to use at least a 3 or 4 fold molar excess of ammonia. If lesser amounts of ammonia are used the reaction should not be carried as near to completion to prevent secondary and tertiary amine formation. In such cases, considerable alcohol would have to be recovered and recycled in addition to unreacted ammonia. Where high secondary and tertiary amine yields are desired the ammonia to alcohol mole ratio may be 1 or slightly lower than 1.

The following examples are illustrative of the process of the present invention:

*Example 1*

646 grams of n-butyl alcohol were placed in an autoclave along with 30 ml. of a thick aqueous slurry of nickel-chromium catalyst prepared from Raney No. 2428 nickel-aluminum-chromium alloy containing about 58% by wt. aluminum, 39.5% nickel and 2.5% chromium. The autoclave was then sealed and the air therein removed by flushing with hydrogen under pressure. The hydrogen was then vented to atmospheric pressure and 220 gms. of anhydrous ammonia was introduced into the autoclave under pressure from a cylinder on a balance. The autoclave was then heated rapidly with stirring to a reaction temperature of 200° C. and held there for a period of 4 hours. The pressure was found to be 1275 p.s.i.g. After the 4 hour reaction period, the reaction mixture was rapidly cooled to room temperature. The excess ammonia was then vented and the mixture removed from the autoclave. Samples of the reaction mixture were removed after the first, second and third hours during the reaction period and the progress of the reaction followed by noting the water content of the sample. After 1 hour 10.6% by weight of the reaction mixture was found to be water. After 2 hours 14.6% by weight of the reaction mixture was found to be water, and after 3 hours the water content of the reaction mixture was found to be 18.9% by weight.

The catalyst was then filtered from the reaction product and the remaining dissolved ammonia distilled off. The amine product was then separated from the crude ammonolysis mixture by fractional distillation. The recovered amines were n-butyl amine and di-n-butyl amine in a weight ratio of 2.7 to 1. No tributyl amines were obtained.

A second example was carried out using the method of the foregoing example except that 646 grams of butyl alcohol was utilized as the starting material and was reacted with 250 grams of ammonia. 30 cc. of catalyst was utilized and the reaction was carried out for 4 hours at a reaction temperature of 250° C. and at a pressure of 2300 p.s.i.g. A sample taken after 1 hour was found to contain 17.28% by weight water. After 2 hours 20.44% by weight of the reaction mixture was found to be water, and after 3 hours the water content of the reaction mixture was found to be 20.84% by weight. The amine product was separated as described above and the recovered amines were found to be n-butyl amine and di-n-butyl amine in a weight ratio of about 2.7 to 1. No tributyl amines were obtained.

The examples in the following table were carried out in a similar manner except that the nonvolatile amine product in Examples 3 and 6 recovered from the crude reaction product by stripping the water off under a vacuum leaving the amine product as a residue.

| Example | Hydroxy-Containing Starting Material | Aminating Agent | Catalyst (cc.) | Reaction Time, hours | Reaction Temperature, °C. | Reaction Pressure, p.s.i.g. | Product |
|---|---|---|---|---|---|---|---|
| 3 | 464 gms. (6) polyoxyethylene tridecyl ether | 102 gms. ammonia | 20 | 3 | 200 | 1,000 | (a) |
| 4 | 450 gms. triethylene glycol | 306 gms. ammonia | 20 | 3 | 200 | 1,900 | (b) |
| 5 | do | do | 20 | 3 | 225 | 2,300 | (c) |
| 6 | 540 gms. (4) polyoxyethylene phenol | 170 gms. ammonia | 20 | 3 | 200 | 1,775 | (d) |

(a) Liquid product containing 1.7% by weight of nitrogen and an acetyl number of 73.
(b) $HOC_2H_4OC_2H_4O—C_2H_4NH_2$, B.P. 127° C. at 1.4 mm. containing 9.33% of nitrogen.
(c) Mixture of $HOC_2H_4OC_2H_4O—C_2H_4NH_2+H_2NC_2H_4OC_2H_4OC_2H_4NH_2$ containing 13.9% by weight of nitrogen.
(d) Liquid product containing 3.41% by weight of nitrogen and an acetyl number of 166.

Similarly these and other hydroxy-containing compounds are aminated with aminating agents, e.g., methyl amine, ethyl amine, diethyl amine and ethylene diamine, to produce useful aminated products.

What is claimed is:

1. In a process for producing aliphatic amines by ammonolysis the steps of reacting an hydroxy-containing compound selected from the group consisting of primary alcohols and secondary alcohols with an aminating agent selected from the group consisting of ammonia, primary amines, and secondary amines, said primary and secondary amines containing from 1 to 6 carbon atoms in the presence of an active metal hydrogenation catalyst the improvement which comprises conducting the ammonolysis reaction in the presence of a Raney nickel catalyst containing a minor amount of chromium and at a temperature from about 150° C. to about 275° C.

2. The process of claim 1 wherein the hydroxy-containing compound is butyl alcohol.

3. The process of claim 1 wherein the aminating agent is ammonia.

4. The process of claim 1 wherein catalyst in the amount of from about 1 to about 5% by weight of the starting material is used.

5. The process of claim 1 wherein the Raney metal catalyst is prepared from an alloy containing from about 45% to about 65% by weight of aluminum, from about 34% to about 50% by weight of nickle and from about 1% to about 5% by weight of chromium.

References Cited

UNITED STATES PATENTS 2,782,237  2/1957  Hindley et al. _____ 260—585
2,923,696  2/1960  Harwell et al. _____ 260—585 X CHARLES B. PARKER, *Primary Examiner.*

R. L. RAYMOND, *Assistant Examiner.*